United States Patent
Nair et al.

(10) Patent No.: US 11,509,408 B1
(45) Date of Patent: Nov. 22, 2022

(54) SYSTEM AND METHOD FOR LARGE DATA TRANSMISSION IN DIGITAL RADIO BROADCASTING

(71) Applicant: INNTOT TECHNOLOGIES PRIVATE LIMITED, Kerala (IN)

(72) Inventors: Rajith Raman Pillai Indusekharan Nair, Kerala (IN); Prasanth Padmalayam Thankappan, Kerala (IN); Abdul Sameeh Parangodath, Kerala (IN); Aswin Karayee, Kerala (IN)

(73) Assignee: INNTOT TECHNOLOGIES PRIVATE LIMITED, Kerala (IN)

( * ) Notice: Subject to any disclaimer, the term of this patent is extended or adjusted under 35 U.S.C. 154(b) by 0 days.

(21) Appl. No.: 17/473,640

(22) Filed: Sep. 13, 2021

(30) Foreign Application Priority Data

Jul. 30, 2021 (IN) .............................. 202141034494

(51) Int. Cl.
*H04H 20/42* (2008.01)
*H04H 40/18* (2008.01)
*H04H 60/87* (2008.01)

(52) U.S. Cl.
CPC .......... *H04H 20/423* (2013.01); *H04H 40/18* (2013.01); *H04H 60/87* (2013.01); *H04H 2201/20* (2013.01)

(58) Field of Classification Search
None
See application file for complete search history.

(56) References Cited

U.S. PATENT DOCUMENTS

| | | | | |
|---|---|---|---|---|
| 5,455,823 A | * | 10/1995 | Noreen | H04B 7/18523 455/12.1 |
| 5,708,974 A | * | 1/1998 | Smith | H04W 28/16 455/62 |
| 5,757,784 A | * | 5/1998 | Liebowitz | H04B 7/18578 379/114.07 |

(Continued)

FOREIGN PATENT DOCUMENTS

| | | | | |
|---|---|---|---|---|
| CN | 101107784 A | * | 1/2008 | ............. H04H 60/15 |
| CN | 101199201 A | * | 6/2008 | ........... H04H 20/426 |

(Continued)

*Primary Examiner* — Berhanu Tadese
(74) *Attorney, Agent, or Firm* — Millen, White, Zelano & Branigan, P.C.; William Nixon (57) ABSTRACT

Large data transmission in digital radio broadcasting system and method are disclosed. A first channel information of tuned frequency indicates the availability of the data distribution table. Second channel information contains the data distribution info table (list of frequencies mapped to data chunk identifiers). Data chunks have a unique id. Digital broadcast radio receiver receives data distribution tables and parses through the currently tuned frequencies data distribution table. The receiver has information on how to collect the distributed data. Receiver uses its primary tuner to receive the data chunks in the current tuned frequency. Rest of the data chunks are collected by the background tuners in a parallel fashion by tuning to required frequencies. Once all chunks are collected, data file is reconstructed and available for presentation to the user.

9 Claims, 4 Drawing Sheets

(56) References Cited

U.S. PATENT DOCUMENTS

| | | | | |
|---|---|---|---|---|
| 6,075,789 A * | 6/2000 | Kasslin | H04H 20/02 | |
| | | | 370/413 | |
| 6,659,947 B1 * | 12/2003 | Carter | A61B 5/0006 | |
| | | | 709/200 | |
| 7,153,263 B2 * | 12/2006 | Carter | A61B 5/0006 | |
| | | | 128/920 | |
| 7,156,807 B2 * | 1/2007 | Carter | H04W 88/08 | |
| | | | 128/920 | |
| 7,606,327 B2 * | 10/2009 | Walker | H04H 20/106 | |
| | | | 455/3.03 | |
| 7,630,967 B1 * | 12/2009 | Srivastava | G06F 16/2453 | |
| 8,176,036 B2 * | 5/2012 | Srivastava | G06F 16/2453 | |
| | | | 707/716 | |
| 8,280,393 B2 * | 10/2012 | Guo | H04W 16/06 | |
| | | | 370/254 | |
| 8,335,872 B2 * | 12/2012 | Pahuja | H04H 20/26 | |
| | | | 710/36 | |
| 8,437,787 B2 * | 5/2013 | Shimonabe | H04B 7/04 | |
| | | | 455/39 | |
| 8,565,685 B2 * | 10/2013 | Immonen | G06F 9/50 | |
| | | | 455/67.11 | |
| 8,855,566 B2 * | 10/2014 | Chang | H04W 72/085 | |
| | | | 370/328 | |
| 8,874,244 B2 * | 10/2014 | Rhoads | G06Q 30/06 | |
| | | | 455/3.06 | |
| 8,934,439 B2 * | 1/2015 | Smith | H04W 16/14 | |
| | | | 370/252 | |
| 9,083,569 B2 * | 7/2015 | Jeon | H04L 27/14 | |
| 9,225,759 B2 * | 12/2015 | Vannithamby | H04W 4/70 | |
| 9,271,280 B2 * | 2/2016 | Pani | H04W 36/18 | |
| 9,332,420 B2 * | 5/2016 | Lim | H04W 8/22 | |
| 9,350,471 B1 * | 5/2016 | Haggerty | H04W 4/18 | |
| 9,374,816 B1 * | 6/2016 | Pani | H04W 36/18 | |
| 9,380,517 B2 * | 6/2016 | Pandey | H04W 28/22 | |
| 9,564,958 B2 * | 2/2017 | Martinez Tarradell | | |
| | | | H04W 64/006 | |
| 9,609,682 B2 * | 3/2017 | Chang | H04W 24/04 | |
| 9,622,122 B2 * | 4/2017 | Zeng | H04W 36/30 | |
| 9,743,456 B2 * | 8/2017 | Chang | H04W 24/10 | |
| 9,763,235 B2 * | 9/2017 | Vannithamby | H04W 36/0088 | |
| 9,814,025 B2 * | 11/2017 | Jung | H04W 8/22 | |
| 9,844,093 B2 * | 12/2017 | Pani | H04W 72/0433 | |
| 9,924,503 B2 * | 3/2018 | Kim | H04L 45/7453 | |
| 10,117,103 B2 * | 10/2018 | Zhao | H04M 15/60 | |
| 10,129,793 B2 * | 11/2018 | Ryoo | H04W 76/20 | |
| 10,171,118 B2 * | 1/2019 | Guan | H04B 17/3913 | |
| 10,225,756 B2 * | 3/2019 | Reider | H04W 24/10 | |
| 10,225,862 B2 * | 3/2019 | Chen | H04W 74/0808 | |
| 10,321,294 B2 * | 6/2019 | Chatterjee | H04W 48/16 | |
| 10,375,691 B2 * | 8/2019 | Jeong | H04W 24/02 | |
| 10,390,206 B2 * | 8/2019 | Agiwal | H04W 76/10 | |
| 10,405,250 B2 * | 9/2019 | Li | H04L 5/0048 | |
| 10,420,065 B2 * | 9/2019 | Gupta | H04W 4/70 | |
| 10,462,784 B2 * | 10/2019 | Feng | H04W 72/082 | |
| 10,574,279 B2 * | 2/2020 | Guan | H04B 17/3913 | |
| 10,574,372 B1 * | 2/2020 | Nair | H04H 20/47 | |
| 10,608,762 B2 * | 3/2020 | Parangodath | H04B 1/16 | |
| 10,616,809 B2 * | 4/2020 | Jang | H04L 12/18 | |
| 10,623,940 B2 * | 4/2020 | Huang | H04W 8/08 | |
| 10,687,310 B2 * | 6/2020 | Chai | H04W 72/042 | |
| 10,863,548 B2 * | 12/2020 | Zhang | H04W 74/0833 | |
| 10,999,869 B2 * | 5/2021 | Chen | H04W 76/27 | |
| 11,031,964 B2 * | 6/2021 | Guan | H04W 72/0453 | |
| 11,039,496 B2 * | 6/2021 | Miao | H04L 43/16 | |
| 11,133,905 B2 * | 9/2021 | Xu | H04B 7/0626 | |
| 2005/0041613 A1 * | 2/2005 | Kuhl | H04L 47/2433 | |
| | | | 370/320 | |
| 2006/0292980 A1 * | 12/2006 | Marcos Alba | H04H 60/13 | |
| | | | 455/3.06 | |
| 2010/0009695 A1 * | 1/2010 | Kwon | H04W 16/06 | |
| | | | 455/452.2 | |
| 2011/0305140 A1 * | 12/2011 | Wang | H04W 72/121 | |
| | | | 370/232 | |
| 2013/0203435 A1 * | 8/2013 | Smith | H04W 16/14 | |
| | | | 455/454 | |
| 2013/0215833 A1 * | 8/2013 | Ong | H04L 43/0876 | |
| | | | 370/329 | |
| 2015/0071257 A1 * | 3/2015 | Yang | H04W 72/0413 | |
| | | | 370/336 | |
| 2015/0111581 A1 * | 4/2015 | Yiu | H04W 4/027 | |
| | | | 455/437 | |
| 2015/0249528 A1 * | 9/2015 | Chen | H04W 72/042 | |
| | | | 370/329 | |
| 2017/0013432 A1 * | 1/2017 | Guo | H04W 76/34 | |
| 2018/0103501 A1 * | 4/2018 | Pani | H04L 1/1812 | |
| 2019/0281644 A1 * | 9/2019 | Hu | H04W 72/0406 | |
| 2019/0349898 A1 * | 11/2019 | Fu | H04W 72/044 | |
| 2020/0137630 A1 * | 4/2020 | Choi | H04W 88/08 | |
| 2020/0169947 A1 * | 5/2020 | Ren | H04W 48/12 | |
| 2020/0170002 A1 * | 5/2020 | Lee | H04W 36/0072 | |
| 2020/0280858 A1 * | 9/2020 | Yan | H04W 16/06 | |
| 2021/0168784 A1 * | 6/2021 | Jung | H04W 72/044 | |
| 2021/0227527 A1 * | 7/2021 | Xue | H04W 72/0453 | |
| 2021/0266754 A1 * | 8/2021 | Draznin | H04W 48/16 | |
| 2021/0307003 A1 * | 9/2021 | Chou | H04W 8/22 | |
| 2021/0385819 A1 * | 12/2021 | Jiang | G01S 17/931 | |
| 2022/0007370 A1 * | 1/2022 | Li | H04W 72/0493 | |
| 2022/0007396 A1 * | 1/2022 | Jiang | H04W 72/1268 | |

FOREIGN PATENT DOCUMENTS

| | | | | |
|---|---|---|---|---|
| CN | 101107784 B | * | 1/2013 | H04H 60/15 |
| CN | 105637769 A | * | 6/2016 | H04H 20/22 |
| CN | 105637769 B | * | 1/2018 | H04H 20/22 |
| CN | 112425189 A | * | 2/2021 | H04B 1/3805 |
| DE | 112005002767 T5 | * | 9/2007 | H04B 7/0874 |
| EP | 1191723 A1 | * | 3/2002 | |
| EP | 1437849 A1 | * | 7/2004 | H04H 20/28 |
| EP | 2632065 A2 | * | 8/2013 | H04H 60/41 |
| EP | 2632065 B1 | * | 5/2018 | H04H 60/41 |
| IN | 201841014795 A | * | 3/2019 | H04B 1/16 |
| IN | 201841044122 A | * | 3/2019 | H04H 20/26 |
| IN | 202141034494 A | * | 8/2021 | |
| IN | 202141052954 A | * | 12/2021 | |
| JP | 2013175968 A | * | 9/2013 | H04H 60/41 |
| JP | 5999923 B2 | * | 9/2016 | H04H 60/41 |
| WO | WO-9001115 A | * | 2/1990 | B60K 31/047 |
| WO | WO-0031907 A1 | * | 6/2000 | |
| WO | WO-0070523 A1 | * | 11/2000 | B42D 25/00 |
| WO | WO-03024031 A1 | * | 3/2003 | H04L 29/06027 |

* cited by examiner

SYSTEM AND METHOD FOR LARGE DATA TRANSMISSION IN DIGITAL RADIO BROADCASTING

FIELD OF INVENTION

This invention comes under the field of broadcast radio communications. This invention specifically deals with a system and method for transmission of large data of time critical information in Digital Radio Broadcasting by distributing data over different broadcasting frequencies.

BACKGROUND OF THE INVENTION

Electromagnetic waves are produced by passing time varying electric current through wires. But these waves do not carry any meaningful information. The electromagnetic waves have a range of spectrum depending on their classification based on frequency or wavelength. The EM waves contain crests and troughs just like any wave. Wavelength refers to the distance between two successive crests or troughs. Frequency refers to the number of crests in a particular time period. The wavelength is inverse to the frequency.

A radio wave is an electromagnetic wave that can carry data. Radio waves are a type of electromagnetic radiation with wavelengths in the electromagnetic spectrum longer than infrared light. Radio waves have frequencies as high as 300 gigahertz (GHz) to as low as 30 hertz (Hz). At 300 GHz the corresponding wavelength is 1 mm, and at 30 Hz the corresponding wavelength is 10,000 km. In order to utilise the EM waves to carry meaningful data, a technique called modulation is done. Modulation is the process of changing a particular property of the wave, whether the amplitude/frequency/phase/etc., in accordance with the input data signal.

Radio broadcasting is transmission of data (usually audio), along with related metadata by radio waves to a wide audience. Digital broadcast radio is the use of digital technology to transmit or receive across the radio spectrum. In terrestrial radio broadcasting the radio waves are broadcasted by a land-based radio station, while in satellite radio the radio waves are broadcasted by a satellite in Earth's orbit. To receive the content the listener must have a broadcast radio receiver.

In digital broadcasting systems, the analog audio signal is digitized, compressed using an audio coding format and transmitted using a digital modulation scheme.

Analog modes of transmission include: AM (Amplitude Modification—modifying the amplitude of a signal according to the input data, keeping the other parameters fixed), FM (Frequency Modification—modifying the frequency of a signal according to the input data, keeping the other parameters fixed), etc. The digital radio stations transmit according to several digital audio standards like DAB (digital audio broadcasting), HD Radio, DRM (Digital Radio Mondiale), CDR, etc.

Digital Radios are high quality digital replacement for analog radio broadcasts in AM and VHF bands. Digital radio technologies such as Digital Audio Broadcasting (DAB), Digital Radio Mondiale (DRM), etc. offer a number of major benefits compared with analog systems, including increased capacity to accommodate more radio channels, highly improved audio quality, more functionality and useful features such as Emergency Warning. Following are the features of Digital Radio broadcasting:

Concurrent Audio and Data transmission
Highly improved Audio quality
Several services in a single frequency.
Data services like Journaline, Program and Service Information, Slide show etc.
Digital Radio supports Emergency Warning System (EWS).

While broadcasting audio digitally, the audio stream data is accompanied by the data stream (Journaline, Slideshow etc.) in the background. The data stream could be used to deliver station logos, images, pictures, and other media files to digital broadcast radio receivers. It is this very extra feature and benefit of Digital Radio which can be used for delivering distance education or emergency warning, for example.

Journaline is a data application for the digital radio systems that provides hierarchically structured textual and multimedia information. The user can easily and immediately access the topics he or she is currently interested in. It is specifically designed for digital broadcast services.

Due to high degree of compression in audio, there is provision for sending data (like Program and Service Information, Traffic Data, Slide Show, Journaline etc). However, due to data rate/bandwidth limitations, there is a limitation of the amount of data including visual data that could be send through a single frequency within a specified time interval. Many a times, context of the data is time dependent. Context is extremely critical sometimes as the data becomes out of context/irrelevant/stale if it reaches the audience after a long time.

Some of the constraints of transmitting data are as follows:

Large files are often not possible. For example, image files are either of very small resolution or often not available.
Video files are not usually transmitted and if at all transmitted, will be small in size.
Large event files such as video of highlights of a cricket match, educational lessons with several images and animations etc., advertisements etc. have size constraints.
Large data files, if at all sent through a single frequency, will take substantial amount of time to be received and reconstructed by the Digital Radio Receiver. By the time, the data reaches the audience, the data might have become out of context/irrelevant/stale.

The following patents try to address some of the issues in digital radio broadcasting of data which could be text/images//videos:

The U.S. Pat. No. 8,874,244B2 is about linking Audio and Other Media Objects via Identifiers, ability to derive identifiers from the content and take actions. Content identification is used by consumer to instruct the content to be delivered to different consumer device and also to interact with remote web servers.

The patent, U.S. Pat. No. 9,350,471B1—Systems and methods for transmitting and receiving large objects via digital radio broadcast, discusses methods and systems for transmitting and receiving large objects via digital radio broadcast. It involves retrieving an object and an object description; assigning a unique identifier to the object; segmenting the object into a plurality of fragments; generating at least one long message having selected ones of the fragments and a long header including the unique identifier and the object description; generating at least one short message having selected ones of the fragments and a short header including the unique identifier; and communicating the at least the long message or the short message to a digital radio broadcast transmitter. The objective of this work is to ensure the reception of large data files transmitted. However, this work does not address the delivery of large data files in a very short time and does not make use of the unused bandwidth of transmitting frequencies lying dormant.

US20050041613A1—Method of transmitting time-critical scheduling information between single network devices in a wireless network using slotted point-to-point links, in which, timing control information, especially scheduling information, is transmitted between single network devices in a wireless network. Timing control information is usually time-critical information since communication parameters may be changing rapidly in wireless networks. The invention provides a method to transmit the time-critical and up-to-date timing control information to a recipient just-in-time. This method deals with point-to-point communication of time critical information between non-centralised single point-to-point devices.

The present invention overcomes the limitation of datafile size and will support large data file transfer in a quick and timely manner and without losing the data (time) context in digital radio broadcasting. Useful applications such as video of highlights of a cricket match, educational lessons with several images and animations etc., context specific advertisements etc could be supported in digital radio broadcasting without losing the time context.

OBJECTIVE OF THE INVENTION

The main objective of our system is to provide a time-efficient transfer of time-critical, large data in digital radio broadcasting.

The secondary objective is to overcome the limitation of datafile size and will support large data file transfer in a quick manner and without losing the data context in digital radio broadcasting.

SUMMARY OF THE INVENTION

The following summary is provided to facilitate a clear understanding of the new features in the disclosed embodiment and it is not intended to be a full, detailed description. A detailed description of all the aspects of the disclosed invention can be understood by reviewing the full specification, the drawing and the claims and the abstract as a whole.

Amount of data that could be sent through a single frequency within a specified time interval has limitations due to data rate constraints and such limitations hinder the user experience which involve quick availability of large data files.

The present invention proposes to divide large data files into different data chunks and set of data chunks are sent over different frequencies depending on the data bandwidth availability of each participating frequency at that point of time. A table detailing the data distribution over participating frequencies is broadcasted to receivers and upon reception of the same, digital radio broadcast receiver will collect the different data chunks from different frequencies and reconstruct the original file quickly without losing the time context.

The present invention overcomes the limitation of datafile size and will support large data file transfer in a quick and timely manner and without losing the data (time) context in digital radio broadcasting. Useful applications such as video of highlights of a cricket match, educational lessons with several images and animations etc., context specific advertisements etc. could be supported in digital radio broadcasting without losing the time context.

The current invention solves the above-mentioned problem by the following methods:
  Availability of Data Lease information of all participating frequencies to the transmitting digital radio station
  Large Data Transfer Preparation
  Large Data Transmission & Reception Every digital radio station receives periodic information regarding the data rate/bandwidth available for leasing for Large Data Transfer. This periodic information also contains the committed time to which such a data rate is available for leasing.

A data distribution table is formed at the digital radio broadcasting station by mapping respective participating frequencies to data chunk identifiers of data chunks getting distributed over these frequencies. Digital broadcast radio receiver will receive data distribution tables and parse through data distribution table available from the currently tuned frequency. Now the receiver has information on how to collect the distributed data. Receiver will use its primary tuner to receive the data chunks in the current tuned frequency.

Rest of the data chunks are collected by the background tuners in a parallel fashion by tuning to required frequencies. Once all chunks are collected, the data file is reconstructed and available for presentation to the user.

The above process is very quick as the data is distributed and the receiver uses its background tuners to scan through various participating frequencies and collect all the required data to reconstruct the original data file. In this way, the time context of the data is not lost.

BRIEF DESCRIPTION OF THE DRAWINGS

The manner in which the proposed system works is given a more particular description below, briefly summarized above, may be had by reference to the components, some of which is illustrated in the appended drawing It is to be noted; however, that the appended drawing illustrates only typical embodiments of this system and are therefore should not be considered limiting of its scope, for the system may admit to other equally effective embodiments.

Throughout the drawings, the same drawing reference numerals will be understood to refer to the same elements and features.

The features and advantages of the present proposed system will become more apparent from the following detailed description a long with the accompanying figures, which forms a part of this application and in which.

REFERENCE NUMERALS

Receiver in tuned state (101)

Checks the large data flag in first channel information of tuned frequency (102)

Digital broadcast radio receiver will receive data distribution tables by parsing second channel information of the currently tuned frequency (104), Background tuners at digital radio receiver tune to frequencies specified in data distribution table (104).

Data chunks will have a unique id, information about size of the chunk, information regarding the frequency that the data chunk represents and data part of the chunk (105). These data chunks are stored.

Data file is reconstructed after reception of all data chunks (106).

Presentation to the user (107)

Primary Radio Tuner (201 *a*)

Background Radio Tuner (201 *b*)

Demodulator & Channel Decoder (Primary instance) (202 *a*)

& Channel Decoder (Secondary instances) (202 *b*)

Data Parser or Data Parsers (203)

Data Aggregator (204)

Large File Reconstruction (205)

Presenting application (206)

Encoded Audio stream-1 (301)

Encoded Audio stream-n (302)

Data (303)

First Channel Information (304)

Second Channel Information (305)

Multiplexer (306)

Channel Coding (307)

Digital Radio Modulator (308)

Digital Radio Signal (309)

Data Distribution Table Indication (310)

Data Distribution Table (311)

DETAILED DESCRIPTION OF THE INVENTION

The principles of operation, design configurations and evaluation values in these non-limiting examples can be varied and are merely cited to illustrate at least one embodiment of the invention, without limiting the scope thereof.

The embodiments disclosed herein can be expressed in different forms and should not be considered as limited to the listed embodiments in the disclosed invention. The various embodiments outlined in the subsequent sections are construed such that it provides a complete and a thorough understanding of the disclosed invention, by clearly describing the scope of the invention, for those skilled in the art.

Digital radio transmission involves the production of a carrier signal which is modulated by the input data signal. This multiplexed signal is transmitted by broadcast transmitters to other radio stations and central stations. These stations are equipped with receivers, which consist of antennae, tuners etc. with the help of which, the received signals are processed and the data signal is retrieved and sent to the user system.

In telecommunications, orthogonal frequency-division multiplexing (OFDM) is a type of digital transmission and a method of encoding digital data on multiple carrier frequencies. OFDM has developed into a popular scheme for wideband digital communication, used in applications such as digital television and audio broadcasting, DSL internet access, wireless networks, power line networks, and 4G/5G mobile communications.

The amount of data that could be sent through a single frequency within a specified time interval has limitations due to data rate constraints and such limitations prevent availability of user desired features which involve quick availability of large data files.

The current invention divides large data files into different data chunks and set of data chunks are sent over different frequencies depending on the data bandwidth availability of each participating frequency at that point of time. A table detailing the data distribution over participating frequencies is broadcasted to receivers and upon reception of the same, digital radio broadcast receiver will collect the different data chunks from different frequencies and reconstruct the original file quickly without losing the time context.

The current system overcomes the limitation of datafile size and will support large data file transfer in a quick manner and without losing the data (time) context in digital radio broadcasting. Useful applications such as video of highlights of a cricket match, educational lessons with several images and animations etc., context specific advertisements etc. could be supported in digital radio broadcasting without losing the time context.

The current invention proposes to solve the mentioned problem by the following methods:

Availability of Data Lease information of all participating frequencies to the transmitting digital radio station Large Data Transfer Preparation Large Data Transmission & Reception Data Rate Lease Information Every digital radio station receives periodic information regarding the data rate available for leasing for Large Data Transfer. This periodic information also contains the committed time to which such a data rate is available for leasing.

This periodic information could be updated through a central server connected via internet to all radio stations.

Every Lease Information Packet has three parts.

Part 1: Transmitting Frequency of the Radio Station

Part 2: Data Rate available for Lease from this frequency

Part 3: Committed Time of Data Rate Lease by the Radio Station for Large Data Transfer Large Data Transfer Preparation:

Large data to be transmitted will be broken up into several small chunks of data. Each chunk of data is identified by a unique identifier. This unique identifier forms the header and data chunk forms the payload. Every digital radio station sending large data will first look into the data rate lease availability over the different frequencies. Based on the data lease availability in each frequency, a data distribution strategy is formed. List of frequencies through which distributed data transmission is prepared.

A data distribution table is formed by mapping respective frequencies to data chunk identifiers of data chunks getting distributed over these frequencies.

In one example as listed in Table 1, suppose there are six frequencies, namely f1, f2, f3, f4, f5, f6 which are transmitting digital audio and data. There are commitments from f1, f2, f4, f6 for lease data rate for a time period t1.

Please find the transmitting frequency in the table 1 below:

| Transmitting Frequency | Data Chunks available (identified by unique id) |
|---|---|
| f1 | d1, d2 -> till d127 |
| f2 | d128 -> till d255 |
| f3 | Not available |
| f4 | d256 -> till d511 |
| f5 | Not available |
| f6 | d512 -> till d1023 |

In this example, digital radio station transmitting at frequency f1 intends to initiate large data transfer. Depending on the availability the Large Data to be transmitted is divided into 1024 data chunks with each data chunk having unique identifier.

Figure 1:
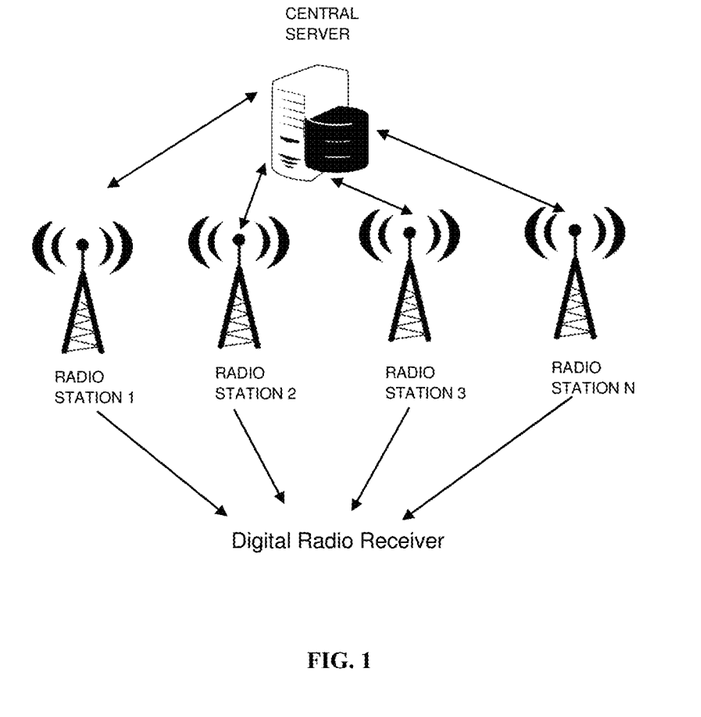
FIG. 1: Block Diagram describing the components and the workflow of our system in accordance to the present invention.
Figure 2:
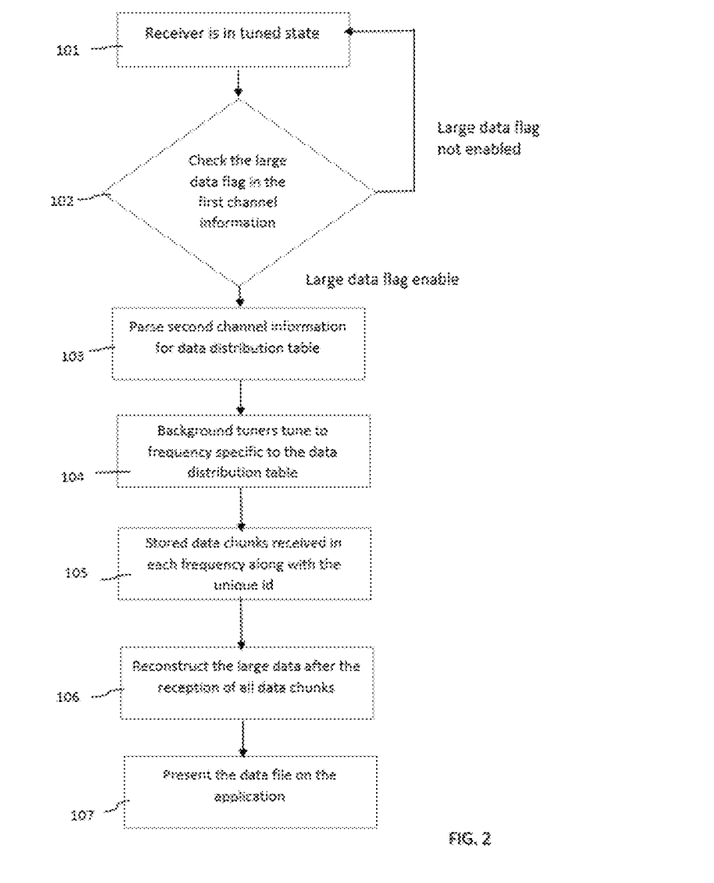
FIG. 2: illustrates the Digital Radio Receiver receiving distributed large data chunks and reconstructing the large data file in accordance to the present invention.

- First channel information of tuned frequency (102) will indicate the availability of the data distribution table.
- Second channel information will contain the data distribution info table (list of frequencies mapped to data chunk identifiers).
- Data chunks will have a unique id, information about size of the chunk, information regarding the frequency that the data chunk represents and data part of the chunk (105).
- Digital broadcast radio receiver will receive data distribution tables and parse through the currently tuned frequencies data distribution table (104).
- Now the receiver has information on how to collect the distributed data.
- Receiver will use its primary tuner to receive the data chunks in the current tuned frequency (101).
- Rest of the data chunks are collected by the background tuners in a parallel fashion by tuning to required frequencies (104).
- Once all chunks are collected, data file is reconstructed (106) and available for presentation to the user (107).

Large Data Transmission & Reception:

First channel information of tuned frequency will indicate the availability of the data distribution table. Second channel information will contain the data distribution info table (list of frequencies mapped to data chunk identifiers). Data chunks will have a unique id, information about size of the chunk, information regarding the frequency that the data chunk represent and data part of the chunk.

Digital broadcast radio receiver will receive data distribution tables and parse through the currently tuned frequencies data distribution table. Now the receiver has information on how to collect the distributed data. Receiver will use its primary tuner to receive the data chunks in the current tuned frequency.

Rest of the data chunks are collected by the background tuners in a parallel fashion by tuning to required frequencies. Once all chunks are collected, data file is reconstructed and available for presentation to the user.

Figure 3:
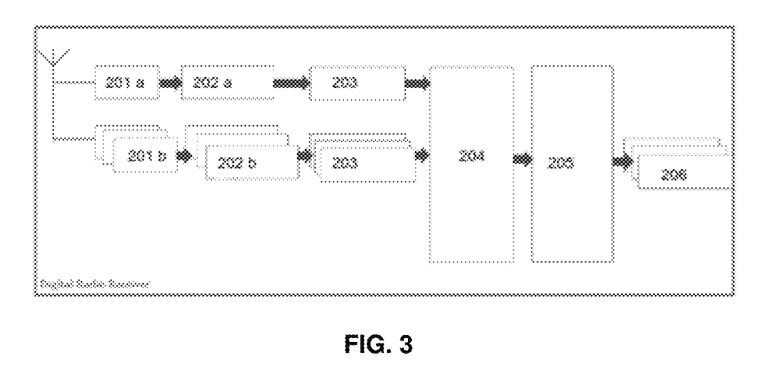
FIG. 3: Block diagram illustrating the reception of large file at the Digital Radio broadcast Receiver.

As illustrated in FIG. 3 the reception of large file at the Digital Radio broadcast Receiver of the present invention includes, Primary Tuner (201 a): The main radio tuner which is tuned to the radio station tuned by the consumer. Background Tuners (201 b): Secondary radio tuners which work in the background for collecting data transmitted in other frequencies.

Demodulator & Channel Decoder (Primary instance) (202 a): Associated with the primary tuner and is responsible for signal demodulation and channel decoding and also detecting the presence of distributed data table. Demodulators & Channel Decoder (Secondary instances) (202 b): Associated with the background tuners and are responsible for background data reception including chunks of large data file. Data Parsers or data Parsers (203): Data Parsers are responsible for parsing distributed data table and also other data like primary/secondary channel information and audio data. Data Aggregator: Data Aggregator (204) is responsible for aggregating the different set of data chunks of large file received from different participating frequencies. Large File Reconstruction (205): This component is responsible for reconstructing the original large file from the aggregated data chunks and providing the reconstructed large file to respective rendering/presenting application (206).

Figure 4:
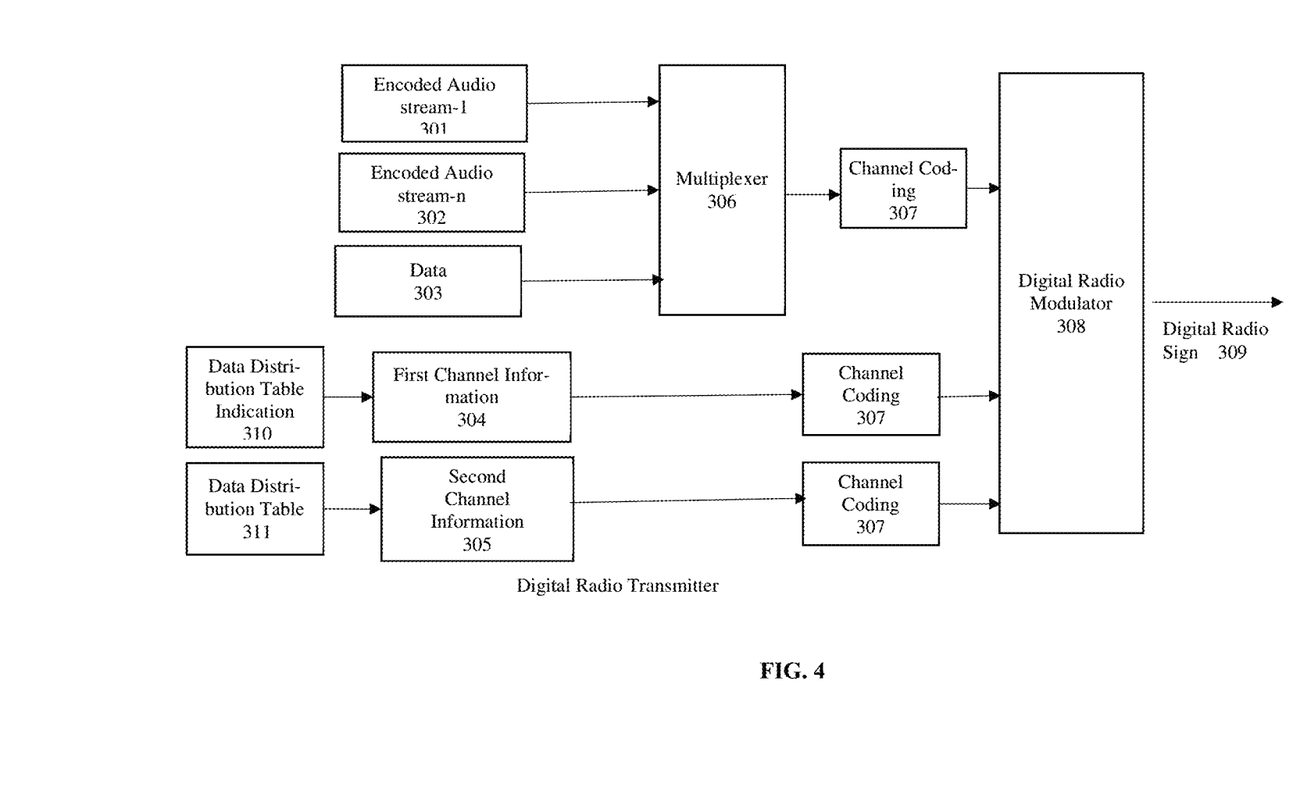
FIG. 4: Block diagram illustrating a transmission device of transmitting large files.

As illustrated in FIG. 4, a large file transmission device includes:

A first information channel (304) and a second information channel (305): the indication of data distribution table (310) is included in the first information channel (304), and data distribution table (311) is included in the second information channel (305). Outputs of the first information channel (304) and the second information channel (305) are then coded at data coding (307).

Data (303) and encoded audio stream-1 (301) to encoded audio stream-n (302) are multiplexed at multiplexer (306). Digital Radio modulator (308) modulates the coded first information channel, the coded second information channel, multiplexed audio stream and data, and generates the digital radio signal (309) for transmission.

The present invention overcomes the limitation of data file size and will support large data file transfer in a quick manner using the available bandwidth of other/participating frequencies and without losing the data context in digital radio broadcasting.

Useful applications such as video of highlights of a cricket match, educational lessons with several images and animations etc., context specific advertisements etc. could be supported in digital radio broadcasting without losing the time context.

The present method is very quick as the data is distributed and the receiver uses its background tuners to scan through various participating frequencies and collect all the required data to reconstruct the original data file. In this way, the time context of the data is not lost.

While the foregoing written description of the invention enables one of ordinary skill to make and use what is considered presently to be the best mode thereof those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A system for transmission of large data of time critical information in Digital Radio Broadcasting by distributing over transmitting frequencies, the system comprising:
   a device for managing data rate lease information, wherein the data rate information comprises three parts: transmitting frequency of a radio station, data rate available for lease from this frequency, and committed time of data rate lease by the radio station for large data transfer; and
   large data transmission device for encoding first channel and second channel information;

large data receiving device, capable of receiving and decoding first channel and second channel information wherein the large data to be transmitted is broken up into a plurality of small data chunks distributed over different transmitting frequencies, wherein the digital radio station sending large data first checks the data rate lease availability over the different transmitting frequencies, wherein a data distribution table is formed by mapping respective transmitting frequencies to data chunk identifiers of the plurality of small data chunks getting distributed over these transmitting frequencies, and wherein the second channel information contains the data distribution information table which is a list of transmitting frequencies mapped to data chunk identifiers, and wherein each of the said data chunks has a unique identifier, information about size of the chunk, information regarding the frequency that the data chunk represent and data part of the chunk.

2. The system for transmission of large data of time critical information in Digital Radio Broadcasting by distributing data over the transmitting frequencies as claimed in claim 1, wherein the said data rate lease information contains periodic information about the committed time to which such a data rate is available for leasing.

3. The system for transmission of large data of time critical information in Digital Radio Broadcasting by distributing data over the transmitting frequencies as claimed in claim 2, wherein the periodic information is updated through a central server connected through internet to all the radio stations.

4. The system for transmission of large data of time critical information in Digital Radio Broadcasting by distributing data over the transmitting frequencies as claimed in claim 1, wherein the said chunk of data is identified by a unique identifier and the said unique identifier forms a header and the data chunk forms a payload.

5. The system for transmission of large data of time critical information in Digital Radio Broadcasting by distributing data over the transmitting frequencies as claimed in claim 1, wherein based on the data lease availability in each transmitting frequency, a data distribution strategy is designed and the list of transmitting frequencies through which distributed data transmission is arranged.

6. The system for transmission of large data of time critical information in Digital Radio Broadcasting by distributing data over the transmitting frequencies as claimed in claim 1, wherein first channel information of tuned frequency indicates the availability of the data distribution table.

7. The system for transmission of large data of time critical information in Digital Radio Broadcasting by distributing data over the transmitting frequencies as claimed in claim 1, further comprising a digital broadcast radio receiver, wherein the said digital broadcast radio receiver receives data distribution tables and parse through the currently tuned frequency's data distribution table, wherein the receiver collects the distributed data using its primary tuner to receive the data chunks in the current tuned frequency, wherein the remaining data chunks are collected by background tuners in a parallel fashion by tuning to required frequencies; and wherein when finally all the chunks are collected, data file is reconstructed and presented to the user.

8. The system for transmission of large data of time critical information in Digital Radio Broadcasting by distributing data over the transmitting frequencies as claimed in claim 1, wherein the large data receiving device is a digital broadcast radio receiver.

9. A method for transmission of large data of time critical information in Digital Radio Broadcasting by distributing data over the transmitting frequencies, comprising:

receiving periodic information regarding a data rate or a bandwidth available for leasing for transferring a large data;

encoding a first channel and a second channel;

receiving and decoding first channel and second channel information;

breaking up the large data to be transmitted into a plurality of small data chunks distributed over different transmitting frequencies;

composing data distribution tables formed at a digital radio broadcasting station by mapping respective participating transmitting frequencies to data chunk identifiers of the plurality of small data chunks-getting distributed over these frequencies;

receiving, by the digital broadcast radio receiver, the data distribution tables and parsing through data distribution table available from the currently tuned frequency;

collecting, using the said receiver, the distributed data and receiving, using its primary tuner, the data chunks in the current tuned frequency, and collecting the remaining data chunks by multiple background tuners in a parallel fashion by tuning to required frequencies, wherein a digital radio station sending large data first checks the data rate lease availability over the different transmitting frequencies, and wherein the second channel information contains the data distribution information table which is a list of transmitting frequencies mapped to the data chunk identifiers, and wherein each of the said data chunks has a unique identifier, information about size of the chunk, information regarding the frequency that the data chunk represent and data part of the chunk, wherein the data file is reconstructed and available for presentation to the user.

* * * * *